Dec. 14, 1965         A. J. HOPPER                3,223,113
              VALVE AND CONTROL MEMBER THEREFOR
Filed Jan. 29, 1962                          2 Sheets-Sheet 1

INVENTOR.
ARTHUR J. HOPPER
BY
Charles L. Lovercheck
attorney

United States Patent Office 3,223,113
Patented Dec. 14, 1965

3,223,113
VALVE AND CONTROL MEMBER THEREFOR
Arthur J. Hopper, 1408 W. Grandview Blvd., Erie, Pa.
Filed Jan. 29, 1962, Ser. No. 169,198
3 Claims. (Cl. 137—467)

This invention relates to valves and, more particularly, to the type of valve shown in Patent No. 2,800,920.

In the valve shown in the said patent, the vanes may be moved from closed position to open position or from open to closed position, depending on the direction of fluid flow.

The present invention discloses a valve which may be manually moved from closed to open position or from open to closed position. The valve will also move to open position when a predetermined pressure is exerted on the inlet end of the valve.

It is, accordingly, an object of the present invention to provide an improved control for a valve.

Another object of the invention is to provide an improved control for a valve in combination therewith.

Still another object of the invention is to provide an improved manual control for a valve.

A further object of the invention is to provide a control for a valve which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Figure 1:
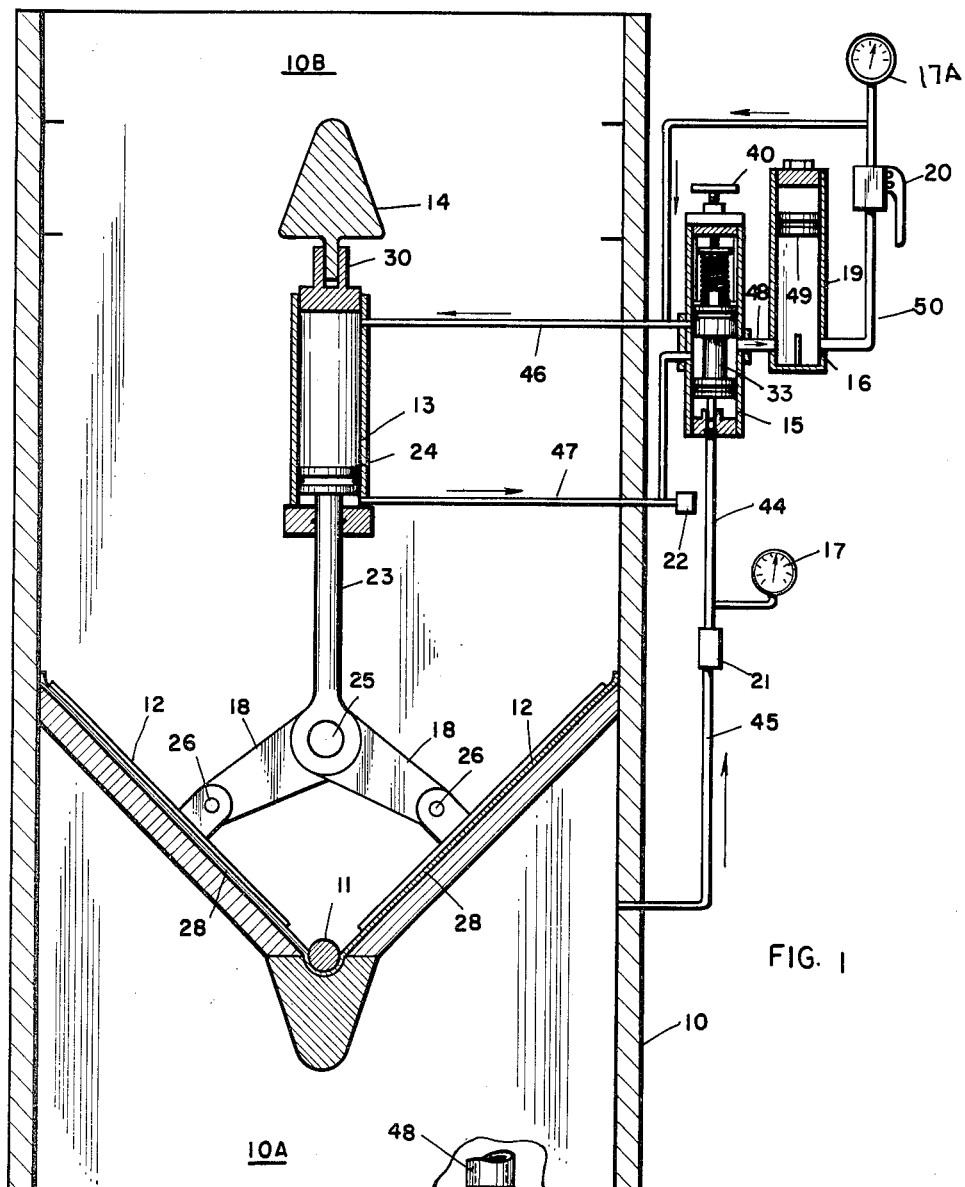
FIG. 1 is a longitudinal cross-sectional view of a valve according to the invention.
Figure 2:
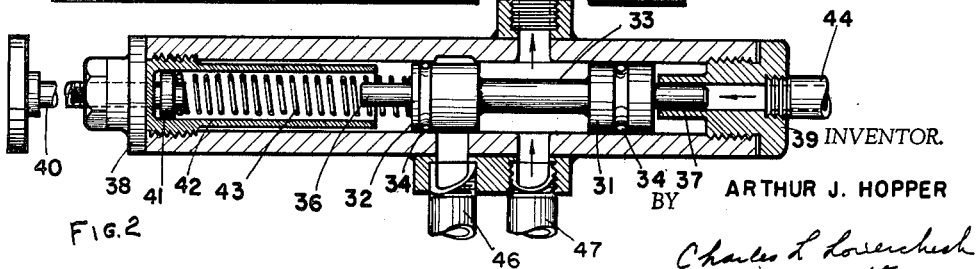
FIG. 2 is an enlarged cross-sectional view of the special valve shown in the drawings.

Now with more particular reference to the drawings, the valve shown in FIGS. 1 and 2 is a safety valve which will open when the upstream pressure exceeds a predetermined value. It has a hollow cylindrical body 10 having an inlet or pressure end 10A and an outlet or exhaust end 10B with vane type control members.

The main valve has a support 11 extending diametrically across the inside of the valve and fixed to the inside of the valve at each end. Vanes 12 are swingably supported to the support 11. The vanes 12 are generally semi-ellipitical in shape and are swingably supported on the support 11 by means of flexible flaps 28.

The vanes 12 are controlled by means of a cylinder 13 which is pivotally supported on the cylindrical body 10 by means of a support 14. The support 14 extends diametrically across the inside of the exhaust end of the valve body and is fixed thereto at each end and has the cylinder 13 pivotally supported thereon at 30. A piston 24 is slidably received in the cylinder 13 and it is pivotally connected through its piston rod 23 to links 18 at 25. The links 18 are, in turn, pivotally connected to the vanes 12 at 26.

A special valve 15 is supported on the outside of the main valve. The special valve 15 has a hollow cylindrical body with a piston spool 33 slidably supported therein. The spool 33 has pistons 31 and 32 supported in spaced relation thereon and this spool slides in the body of the special valve to connect line 48 with line 47 or to connect line 48 with line 46. The pistons 31 and 32 each have an O-ring 34 thereon. The lines 46 and 47 are connected to the inside of the hydraulic cylinder 13 at opposite sides of the piston 24.

A line 44 is connected to a gauge 17 and through a restricting check valve 21 and pipe 45 to the inside of the main valve.

The special valve 15 has an end cap 39 threadably received in one end and the end cap 38 threadably received at the other end. The end cap 39 has a bore therein which slidably receives an end 37 of the spool 33 and an end 36 of the spool is received in a spring 43. The end 36 provides a guide for the spring 43.

The adjusting handwheel and its shaft 40 are threadably received in the end cap 38 and may be rotated to move the boss 41 toward or away from the spool 33 in order to compress the spring 43. The spring 43 is received in a hollow bore 42 in the end cap 38 and the spring rests against the boss 41 and the piston 32.

The line 48 is connected to a reservoir 19. Reservoir 19 acts as a chamber to receive the fluid displaced from the cylinder 13 by the piston 24. The reservoir 19 has a sliding piston 49 therein and the sliding piston 49 moves up or down, dependent upon the amount of fluid forced into or from the reservoir by piston 24. The reservoir is connected through a line 50 and a hand pump 20 to the line 46. The line 46 has a gauge 17A thereon by which the pressure exerted by the pump can be measured. The pump 20 could be an automatic pump set to start when the pressure at 10A dropped below a predetermined value.

Assuming the special valve 15 to have its spool in the position shown and no pressure to be in the line connected to the main valve, the handwheel and shaft 40 would be set to compress the spring 43 to the desired value so that the vanes 12 would open at the desired pressure. When this pressure increased in the inlet end 10A, it would build up behind the vanes 12. This pressure would be impressed on the end of the spool 33 through the line 44 and pipe 45. When the pressure on the end of spool 33 reached a predetermined value, the piston would be moved against the force of spring 43 to a position to connect the lines 46 and 47 together. This would allow fluid in the hydraulic cylinder 13 to circulate from one side of the piston 24 to the other and the pressure on the vanes 12 would move the piston 24 toward its support 14. Should the pressure drop momentarily, the restricting check valve 21, which allows a rapid flow when the vanes are opening and a restricted flow during closing of the vanes 12, would prevent the spool 33 from shifting back and closing the special valve 15.

Should the operator desire to operate the vanes 12 of the main valve manually when the pressure in the inlet end 10A is below a predetermined value, the operator would operate the pump 20. This would pump fluid from the reservoir 19 into the space on the side of the piston 24 next to the support 14 and as piston 24 moves, it would force fluid from the other end of the cylinder through the line 47 and the valve 15 to the reservoir 19. When it is desired to open the valve 15, the pump output can be reversed and fluid under pressure can be pumped through the line 47 into the side of the piston 24 remote from the support 14.

Therefore, vanes 12 can be opened or closed by the operating pump 20 at a time when the valve 15 is in the position shown. A pressure can be maintained above the piston 49 to keep air from entering under piston 49. In a case where oil is used as the control fluid, such air would tend to emulsify the oil in the cylinder 13 and the circuit connected thereto.

Figure 3:
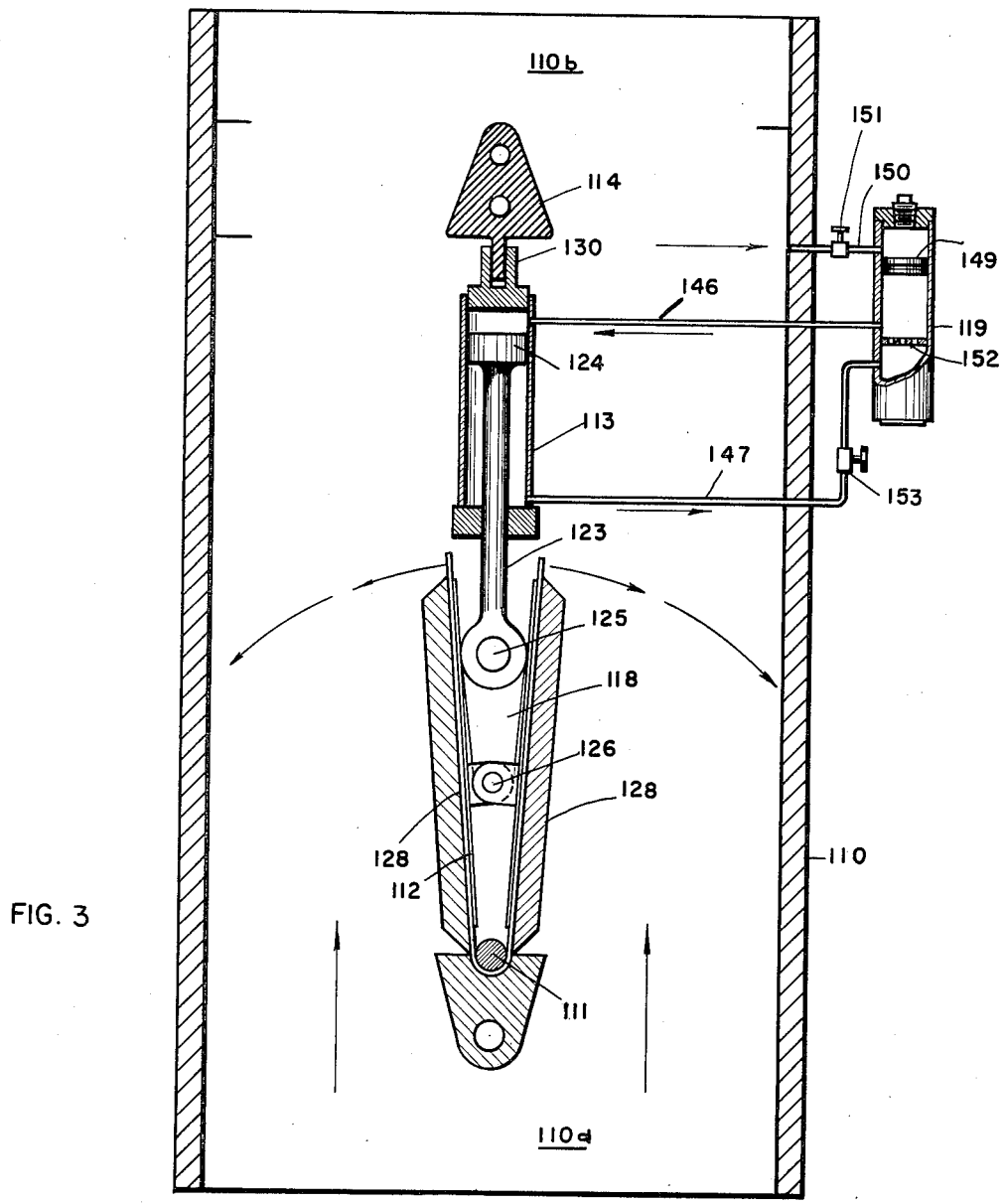
FIG. 3 shows another embodiment of the invention.

In the embodiment of the invention shown in FIG. 3, a check valve is shown having a control to prevent it from slamming and to regulate its speed of opening. The valve shown has a hollow cylindrical body 110 having an inlet or pressure end 110a and an outlet or exhaust end 110b.

The valve has a support 111 extending diametrically across the inside of the valve and fixed to the inside of the valve at each end. To the support 111 are swingably supported vanes 128. The vanes 128 are generally semi-elliptical in shape and are swingably supported on the support 111 by means of flexible flaps 112 in the same manner as the valve shown in the patent aforesaid.

The vanes 128 are controlled by means of a cylinder 113 which is pivotally supported on the cylindrical body 110 by means of a support 114. The support 114 extends diametrically across the inside of the exhaust end of the valve body and is fixed thereto at each end and has the cylinder 113 pivotally supported thereon at 130. A piston 124 is slidably received in the cylinder 113 and it is pivotally connected through its piston rod 123 to links 118 at 125. The links 118 are, in turn, pivotally connected to the vanes 128 at 126.

A pipe 147 is connected to a cylinder 119 which has a sliding piston 149 therein which moves up and down with the movement of the piston 124 and prevents air from entering the fluid under the piston 124 to form an emulsion. A baffle plate 152 is formed in the cylinder 119 and this also acts as a restriction to flow. Therefore, pipes 146 and 147 are connected at their outer ends in the cylinder 119. Flow through the pipe 147 is controlled by a manually adjustable valve 153.

When the valve 153 is opened, the piston 124 will move freely in the cylinder 113 so that the vanes 128 freely move as in a check valve.

When the throttle valve 153 is closed, there can be no flow of fluid through the pipes 146 and 147 and, therefore, the vanes 128 will be held in fixed position or the valve 153 can be set to regulate the speed of movement of the piston 124.

When valves 151 and 153 are opened, pressure above the piston 149 will equalize with that at outlet 110b. The piston 124 can force fluid through the pipe 146 to move the piston 149 and, therefore, the vanes 128 can be opened or closed but, in either case, fluid will be trapped in the space between the piston 124 and the vanes 128.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:
1. A main valve and control therefor comprising
   a hollow cylindrical body defining a passage therethrough,
   a support in said body extending diametrically thereof,
   vanes generally semi-elliptical in shape attached to said support and swingable thereon to open or close said passage,
   flow through said cylindrical body tending to swing said vanes to the open position,
   a piston having a connected piston rod,
   means connecting said piston rod to said vanes,
   a hydraulic cylinder closed at its ends in said hollow cylindrical body having its longitudinal axis parallel to the axis of said cylindrical body,
   means supporting said hydraulic cylinder in said cylindrical body,
   said piston being arranged for reciprocation in said hydraulic cylinder so that application of fluid pressure to one side thereof will tend to effect movement of said vanes to closed position in opposition to said tendency to be opened by flow through of fluid through said body,
   pipe means including a second cylinder establishing communication between opposite sides of said piston,
   said pipe means being completely filled with hydraulic control fluid,
   means associated with said second cylinder to permit equalization of the hydraulic control fluid pressure on opposite sides of said piston or to block communication through said pipe means,
   means to effect a differential in pressure on opposite sides of said piston in a direction to effect opening or closing of said passage.
2. The main valve recited in claim 1 wherein
   said means connecting said piston rod to said piston comprises links each having a first end and a second end,
   the first end of each said link being connected at one end to said piston rod and connected at the said second end to a said vane.
3. The main valve recited in claim 1 wherein
   said means to effect a differential pressure on opposite sides of said piston comprises a pump.

References Cited by the Examiner

UNITED STATES PATENTS

| | | | |
|---|---|---|---|
| 1,487,038 | 1/1920 | Spencer | 137—514 |
| 2,526,039 | 5/1946 | Oakes | 251—54 |

ISADOR WEIL, *Primary Examiner.*

M. CARY NELSON, WILLIAM F. O'DEA, *Examiners.*